US012609332B2

(12) United States Patent
Stahl et al.

(10) Patent No.: US 12,609,332 B2
(45) Date of Patent: Apr. 21, 2026

(54) ELECTROCHEMICAL DEVICE AND METHOD FOR PRODUCING AN ELECTROCHEMICAL DEVICE

(71) Applicant: EKPO FUEL CELL TECHNOLOGIES GMBH, Dettingen (DE)

(72) Inventors: Peter Stahl, Metzingen (DE); Jürgen Kraft, Metzingen (DE); Manuel Morcos, Tübingen (DE); Michael Götz, Dettingen/Erms (DE)

(73) Assignee: EKPO FUEL CELL TECHNOLOGIES GMBH, Dettingen (DE)

( * ) Notice: Subject to any disclaimer, the term of this patent is extended or adjusted under 35 U.S.C. 154(b) by 586 days.

(21) Appl. No.: 17/886,273

(22) Filed: Aug. 11, 2022

(65) Prior Publication Data

US 2022/0384822 A1     Dec. 1, 2022

Related U.S. Application Data

(63) Continuation of application No. PCT/EP2021/053105, filed on Feb. 9, 2021.

(30) Foreign Application Priority Data

Feb. 12, 2020    (DE) ..................... 10 2020 103 624.8

(51) Int. Cl.
*H01M 8/0273*      (2016.01)
*H01M 8/0247*      (2016.01)
*H01M 8/0286*      (2016.01)
(52) U.S. Cl.
CPC ....... *H01M 8/0273* (2013.01); *H01M 8/0247* (2013.01); *H01M 8/0286* (2013.01)

(58) Field of Classification Search
CPC ............. H01M 8/0273; H01M 8/0247; H01M 8/0286; H01M 8/0254; H01M 8/0276; Y02E 60/50; Y02P 70/50
See application file for complete search history.

(56) References Cited

U.S. PATENT DOCUMENTS

2002/0055027 A1*   5/2002   Inoue .................. H01M 8/0271
                                                      429/492
2012/0237847 A1     9/2012   Han

FOREIGN PATENT DOCUMENTS

CN         104538654         4/2015
CN         108054407         5/2018
(Continued)

OTHER PUBLICATIONS

English translation of DE-102016202481-A1 (Year: 2017).*
(Continued)

*Primary Examiner* — Ula C Ruddock
*Assistant Examiner* — Sarika Gupta
(74) *Attorney, Agent, or Firm* — Hanley, Flight & Zimmerman, LLC

(57) ABSTRACT

In order to create an electrochemical device, comprising a plurality of electrochemical units, which succeed one another along a stack direction, wherein each electrochemical unit comprises a bipolar plate and an electrically insulating seal, and a clamping device for clamping the electrochemical units along the stack direction, in which electrochemical device the risk of a short circuit between adjacent bipolar plates is reduced without the expenditure for the production of the electrochemical device being excessively increased, it is proposed that at least one seal of at least one electrochemical unit in the pressed state protrudes laterally beyond a contour of the bipolar plate of the
(Continued)

electrochemical unit in a direction of protrusion directed perpendicularly to the stack direction.

15 Claims, 5 Drawing Sheets

(56) References Cited

FOREIGN PATENT DOCUMENTS

| | | |
|---|---|---|
| DE | 10358052 | 6/2005 |
| DE | 102006032530 | 1/2008 |
| DE | 102016202481 | 8/2017 |
| DE | 102016202481 A1 * | 8/2017 |
| DE | 102017101954 | 8/2018 |
| EP | 1633011 | 3/2006 |
| EP | 1633011 A1 * | 3/2006 .......... H01M 8/0206 |
| EP | 2065958 | 6/2009 |
| JP | 5086543 B2 * | 11/2012 |

OTHER PUBLICATIONS

English translation of JP-5086543-B2 (Year: 2012).*
German Patent Office, "Search Report," issued in connection with German application No. 102020103624.8, dated Jul. 31, 2020, 12 pages, with English translation.
International Search Authority, "International Search Report and Written Opinion ," issued in connection with PCT international application No. PCT/EP2021/053105, dated May 4, 2021, 14 pages, with English translation.
International Search Authority, "International Preliminary Report on Patentability," issued in connection with PCT international application No. PCT/EP2021/053105, dated Aug. 25, 2022, 16 pages, with English translation.

* cited by examiner

ELECTROCHEMICAL DEVICE AND METHOD FOR PRODUCING AN ELECTROCHEMICAL DEVICE

RELATED APPLICATIONS

This application is a continuation of international application number PCT/EP2021/053105 filed on 9 Feb. 2021 and claims the benefit of German application number 10 2020 103 624.8 filed on 12 Feb. 2020.

The present disclosure relates to the subject matter disclosed in international application number PCT/EP2021/053105 of 9 Feb. 2021 and German application number 10 2020 103 624.8 of 12 Feb. 2020, which are incorporated herein by reference in their entirety and for all purposes.

FIELD OF THE DISCLOSURE

The present invention relates to an electrochemical device that comprises a plurality of electrochemical units, which succeed one another along a stack direction, wherein each electrochemical unit comprises a bipolar plate and an electrically insulating seal, and wherein the electrochemical device comprises a clamping device for pressing together the electrochemical units along the stack direction.

In known electrochemical devices of this kind, on the outer face of the stack formed of electrochemical units and/or on the delimiting faces of medium channels through which the fluid media required for the operation of the electrochemical device are fed to the electrochemical units, there is an increased risk of electrical short circuits between the bipolar plates of the electrochemical units succeeding one another in the stack direction, because the outer and inner rim regions of the bipolar plates are freely accessible. Such an electrical short circuit can be caused, for example, by deposits of dirt or other foreign particles and/or by contaminated, in particular non-deionized, water.

The additional application of electrically insulating layers in the outer and inner rim regions of the bipolar plates requires a high expenditure in the production process and can lead to restrictions in the process sequence, in particular in the manufacturing processes of the individual components of the electrochemical device, particularly when the outer contours and/or in the inner contours of the bipolar plates are made of more than one layer.

SUMMARY OF THE INVENTION

In accordance with an embodiment of the invention, an electrochemical device of the kind described at the outset is created in which the risk of a short circuit between adjacent bipolar plates is reduced without the expenditure for the production of the electrochemical device being excessively increased.

In accordance with an embodiment of the invention, provision is made in an electrochemical device with the features of the preamble of claim 1 that at least one seal of at least one electrochemical unit in the pressed state protrudes laterally beyond a contour of the bipolar plate of the electrochemical unit in a direction of protrusion directed perpendicularly to the stack direction.

Thus, the concept underlying the invention is to use the seals, which are already required to separate different media spaces of the electrochemical device from one another and/or from the environment of the electrochemical device, additionally to at least partially shield the bipolar plates on their outer contours from the environment of the electrochemical device and/or on their inner contours from the medium channels passing through the electrochemical device in order to thus prevent that electrically conductive elements, for example dirt or other foreign particles or contaminated, in particular non-deionized, water, is able to reach the region between the bipolar plates and lead to a short circuit between adjacent bipolar plates.

The contour beyond which the at least one seal of at least one electrochemical unit in the pressed state protrudes laterally in a direction of protrusion directed perpendicularly to the stack direction may be an outer contour or an inner contour of the bipolar plate.

The seal may protrude laterally beyond the contour across part of the periphery of the respective contour of the bipolar plate or across the entire periphery of the respective contour of the bipolar plate.

In a particular embodiment of the invention, provision is made that at least one seal of at least one electrochemical unit in the pressed state protrudes beyond an outer contour of the bipolar plate of the electrochemical unit into an outside space of the electrochemical device.

Alternatively or in addition hereto, provision may be made that at least one seal of at least one electrochemical unit in the pressed state protrudes beyond an inner contour of the bipolar plate of the electrochemical unit into a medium channel of the electrochemical device.

It is particularly preferable if at least one seal of at least one electrochemical unit in the pressed state protrudes both beyond an outer contour of the bipolar plate of the electrochemical unit into an outside space of the electrochemical device and beyond an inner contour of the bipolar plate of the electrochemical unit into at least one medium channel of the electrochemical device.

The at least one seal of at least one electrochemical unit in the pressed state preferably abuts against a seal of an adjacent electrochemical unit.

It is particularly favorable if at least one outer contour of at least one bipolar plate is shielded, preferably substantially completely and/or preferably across substantially the entire periphery of the outer contour of the respective bipolar plate, from an outside space of the electrochemical device by at least one seal adjacent to the bipolar plate.

It is further favorable if at least one inner contour of at least one bipolar plate is shielded, preferably substantially completely and/or preferably across substantially the entire periphery of the respective inner contour of the respective bipolar plate, from a medium channel of the electrochemical device by at least one seal adjacent to the bipolar plate.

In a particular embodiment of the invention, provision is made that the seal in the unpressed state, across part of the periphery of the respective contour of the respective bipolar plate or across the entire periphery of the respective contour of the respective bipolar plate, does not protrude laterally beyond the contour of the bipolar plate in a direction of protrusion directed perpendicularly to the stack direction.

The seal may comprise a contact region, which in the unpressed state and/or in the pressed state abuts against at least one adjacent bipolar plate.

Provision is preferably made that the seal abuts with at least one contact region against two adjacent bipolar plates of the electrochemical device.

In a particular embodiment of the invention, provision is made that the contact region in the unpressed state is of asymmetrical configuration in relation to a longitudinal plane of the seal, which extends in parallel to the stack direction and in parallel to a longitudinal direction of the seal through a rounded tip of the contact region. As a result of such an asymmetrical configuration of the contact region, the tendency of the contact region to move in the direction toward the outer contour or inner contour of an adjacent bipolar plate and/or across the outer contour or inner contour of the adjacent bipolar plate when pressing the electrochemical units of the electrochemical device can be encouraged.

The seal may comprise an insulating region, which in the pressed state abuts against an insulating region of a further seal of the electrochemical device.

The seal may have one or more wedge-shaped regions.

In a preferred embodiment of the invention, provision is made that the outer faces of the seals of the electrochemical device in the pressed state form a closed outer sealing face on an outer side of the electrochemical device.

Here, provision may be made, in particular, that the outer sealing face surrounds the electrochemical device along its entire periphery.

Further, it is favorable if the inner faces of the seals of the electrochemical device in the pressed state form a closed inner sealing face on an inner side of the electrochemical device adjoining a medium channel of the electrochemical device.

It is particularly favorable if such a closed inner sealing face surrounds the respective medium channel along its entire periphery.

The present invention further relates to a method for producing an electrochemical device, which comprises the following:

forming a stack, which comprises a plurality of electrochemical unit succeeding one another along a stack direction, wherein each electrochemical unit comprises a bipolar plate and an electrically insulating seal; and clamping the stack of electrochemical units by means of a clamping device.

Underlying the present invention is the further object of creating a method of the kind stated above, by which an electrochemical device is produced in which the risk of a short circuit between adjacent bipolar plates in the stack of electrochemical units is reduced without the expenditure for the production of the electrochemical device being excessively increased.

This object is achieved, in accordance with the invention, in a method with the features of the preamble of claim 15 in that at least one seal of at least one electrochemical unit in the pressed state protrudes laterally beyond a contour of the bipolar plate of the electrochemical unit in a direction of protrusion directed perpendicularly to the stack direction.

Here, provision may be made, in particular, that at least one seal of at least one electrochemical unit in the unpressed state does not (yet) protrude laterally beyond the respective contour of the bipolar plate in a direction of protrusion directed perpendicularly to the stack direction.

The method in accordance with the invention for producing an electrochemical device is suited, in particular, for producing an electrochemical device in accordance with the invention.

Particular embodiments of the method in accordance with the invention for producing an electrochemical device have already been described above in connection with particular embodiments of the electrochemical device in accordance with the invention.

The electrochemical device in accordance with the invention may be, in particular, a fuel cell device, an electrolyzer, or a battery stack.

A fluid medium required for the operation of the electrochemical device, for example an anode gas, a cathode gas, or a cooling medium, can be fed to the electrochemical units of the electrochemical device or be discharged from the electrochemical units of the electrochemical device through a medium channel of the electrochemical device.

The medium channel preferably extends substantially in parallel to the stack direction of the electrochemical device.

In accordance with the invention, at least one seal is configured such that, after assembling the stack of electrochemical units and after clamping the stack along the stack direction, it laterally protrudes beyond at least one bipolar plate adjacent to the seal in a direction of protrusion directed perpendicularly to the stack direction of the stack.

The seals of the electrochemical device may be configured, in particular, such that in the pressed state of the electrochemical device they completely enclose the outer faces of the stack, such that no more bipolar plates of the electrochemical device are visible from the outside space of the electrochemical device.

The overhang of the seal laterally beyond at least one adjacent bipolar plate in the direction of protrusion directed perpendicularly to the stack direction may already be present before clamping the stack of electrochemical units or only be produced during the clamping of the stack of electrochemical units as a result of a movement of at least part of the seal.

In the pressed state of the electrochemical units, the outer contours and/or the inner contours of the bipolar plates can be reliably insulated from one another and from outside influences, such that short circuits between the bipolar plates can be excluded due to the construction.

In particular, it is prevented that the bipolar plates on their outer periphery are contacted by electrically conductive foreign particles and/or by electrically conductive, in particular non-deionized, water, such that the occurrence of short circuits is avoided.

The contours of the bipolar plates protected by the seals may be located both in the region of the outer faces of the stack of electrochemical units and in the region of inner faces of the stack of electrochemical units, in particular in the region of inner faces of the stack that face toward a medium channel of the electrochemical device.

If provision is made that the seal moves in a direction perpendicular to the stack direction during the pressing of the stack of electrochemical units along the stack direction, such that the overhang of the seal over an adjacent bipolar plate is achieved only during the pressing of the stack, this may be advantageous for the assembly of the stack of electrochemical units, because in this case it is possible to bring the electrochemical units together via the outer edges of the bipolar plates when stacking one on top of the other.

The seal of each electrochemical unit of the electrochemical device may be of one-part configuration or consist of two or more seal parts.

A movement of the seal perpendicularly to the stack direction during the pressing of the stack of electrochemical units can be achieved through the geometric form of the seal or through the geometric form of one or more of the bipolar plates adjacent to the seal.

The material properties and/or the geometry of the seal or at least one of the bipolar plates adjacent to the seal can be influenced such that the friction coefficients between the seal and the at least one adjacent bipolar plate are locally reduced or increased in a targeted manner in such a way that the movement of the seal during the pressing of the stack of electrochemical units perpendicularly to the stack direction in encouraged.

Here, provision may be made, in particular, that the seal and/or at least one of the bipolar plates adjacent to the seal are treated by a plasma treatment, by a treatment with a primer, and/or by a treatment with a lubricating agent such that the friction coefficient between the seal and the at least one adjacent bipolar plate is locally altered.

Alternatively or in addition hereto, the friction coefficient between the seal and the at least one adjacent bipolar plate may be achieved by a geometric structuring of the seal and/or the respective bipolar plate and/or by producing a smooth surface in a targeted manner on the seal and/or on the at least one bipolar plate.

The seal may be made, in particular, of an elastomer material.

The seal may be produced, for example, by an injection molding process, by a pattern printing process, in particular a screen printing process, or by a bead application process.

The seal may be connected to an adjacent bipolar plate, to a gas diffusion layer, to a constituent part of a membrane electrode arrangement of the electrochemical unit, and/or to another support element.

The bipolar plates may be made of one or more metallic materials.

Each bipolar plate may be of single-layer or multi-layer configuration.

The electrochemical units of the electrochemical device preferably comprise a polymer electrolyte membrane (PEM).

It is particularly favorable if the seals of the electrochemical device enclose the outer contours of the bipolar plates of the electrochemical device, at least after the pressing of the stack of electrochemical units, such that an electrical insulation protection is ensured.

The seal may be placed in the electrochemical unit as a separate component or be materially bonded to the bipolar plate of the electrochemical unit or to a constituent part of the membrane electrode arrangement (MEA) or to a porous gas diffusion layer of the electrochemical unit.

Further advantages and features of the invention are subject matter of the subsequent description and the graphical representation of exemplary embodiments.

BRIEF DESCRIPTION OF THE DRAWINGS

The same or functionally equivalent elements are provided with the same reference numerals in all Figures.

DETAILED DESCRIPTION OF THE INVENTION

Figure 1:
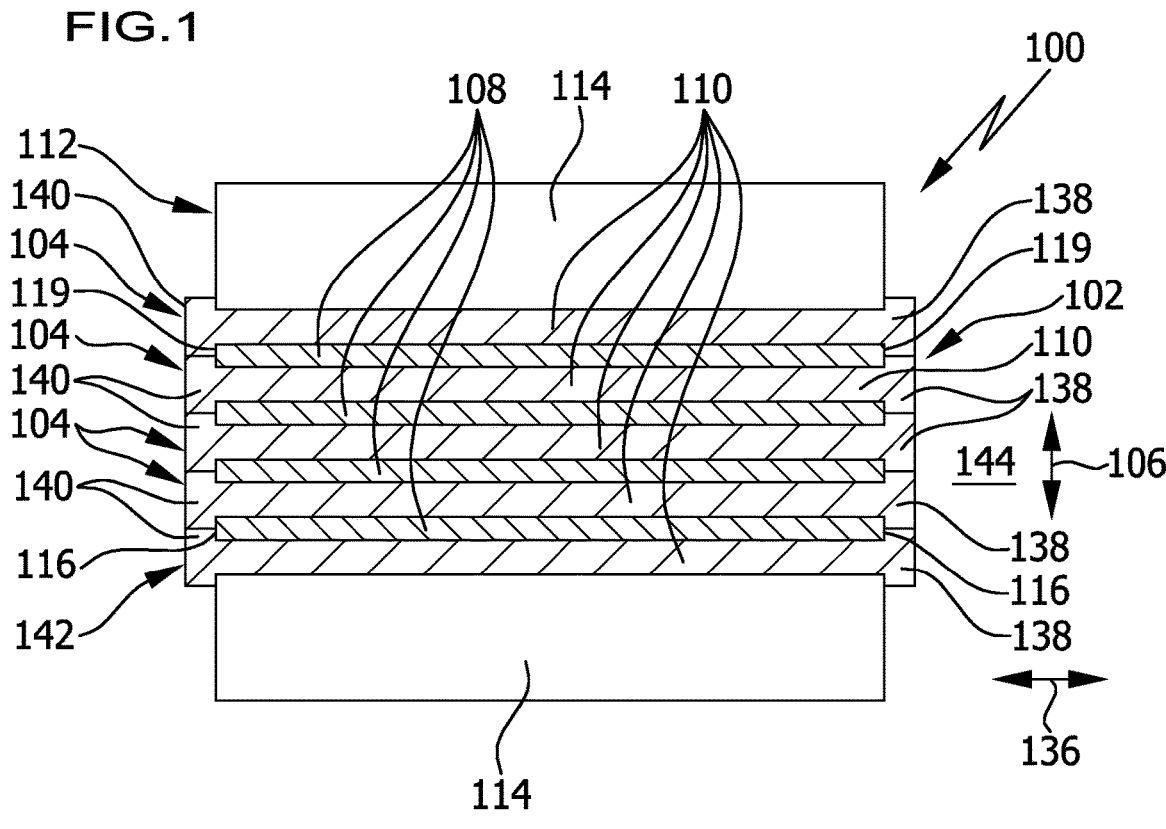
FIG. 1 shows a schematic depiction of an electrochemical device that comprises a plurality of electrochemical units, which succeed one another along a stack direction, and a clamping device for pressing the electrochemical units along the stack direction, wherein each electrochemical unit comprises a bipolar plate and an electrically insulating seal and wherein the seals of the electrochemical units in the pressed state protrude laterally beyond a contour of the bipolar plates of the electrochemical units in a direction of protrusion directed perpendicularly to the stack direction.

An electrochemical device, depicted in FIGS. 1 to 4 and denoted as a whole with 100, is configured, e.g., as a fuel cell device or as an electrolyzer.

The electrochemical device 100 comprises a stack 102, which comprises a plurality of electrochemical units 104 that succeed one another along a stack direction 106.

Each of the electrochemical units 104 comprises a bipolar plate 108 and an electrically insulating seal 110 as well as an electrochemically active unit (which is not depicted), in which an electrochemical reaction between electrochemically reactive species occurs, which originate from the fluid reaction media fed to the electrochemical device 100, in particular an anode gas and a cathode gas.

In the pressed state depicted in FIG. 1, the electrochemical units 104 of the electrochemical device 100 are clamped along the stack direction 106 by means of a clamping device 112, which comprises end plates 114 between with the stack 102 of electrochemical units 104 is arranged.

The end plates 114 may be braced against one another in any manner, for example by means of tie rods.

Figure 2:
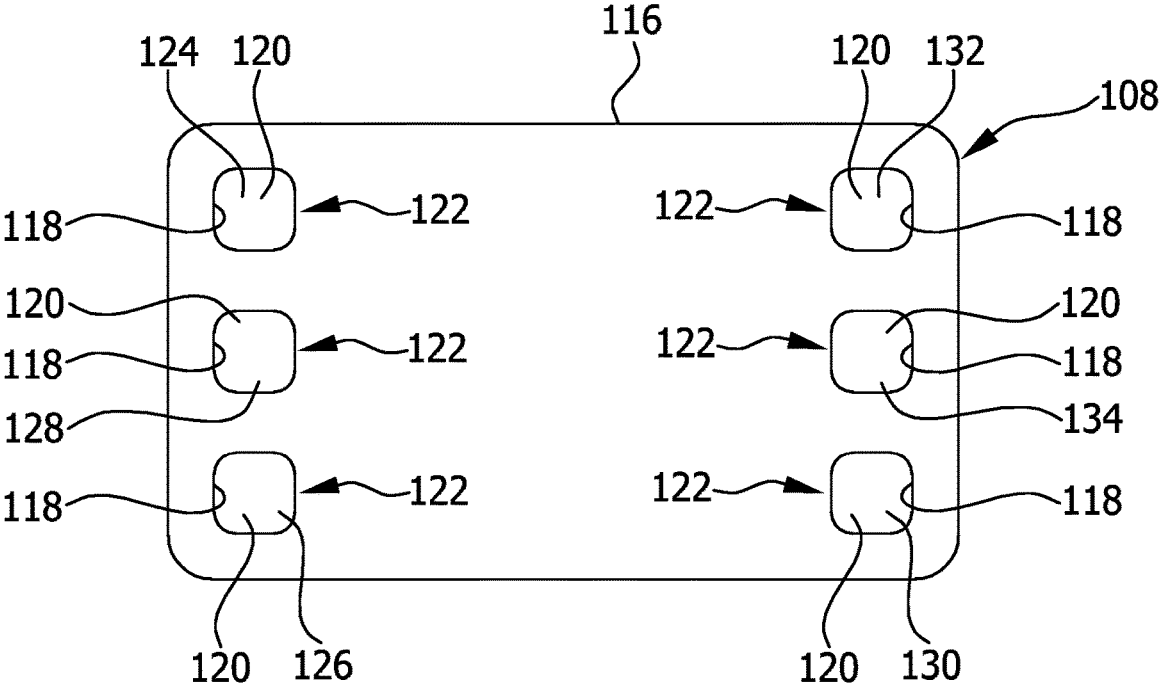
FIG. 2 shows a schematic plan view of one of the bipolar plates of the electrochemical device from FIG. 1.

Each of the bipolar plates 108 has, as can be best seen in FIG. 2, an outer contour 116 and a plurality of inner contours 118, which each surround a medium through-opening 120 of the bipolar plate 108.

Each of the medium through-openings 120 forms a constituent part of a respectively associated medium channel 122, which passes through the stack 102 of electrochemical units 104 in parallel to the stack direction 106.

The medium channels 122 serve to feed fluid media to the electrochemical units 104 or to discharge fluid media from the electrochemical units 104.

In particular, provision may be made that each one of the medium channels 122 is configured as an anode gas supply channel 124, as a cathode gas supply channel 126, as a cooling medium supply channel 128, as an anode gas discharge channel 130, as a cathode gas discharge channel 132, or as a cooling medium discharge channel 134.

Each bipolar plate 108 has a respective flow field for each of these fluid media, through which the fluid medium can flow from the respectively associated supply channel to the respectively associated discharge channel, along a flow direction that is directed substantially perpendicularly to the stack direction 106.

In particular, the bipolar plate 108 may have an anode gas flow field, through which the anode gas can flow from the anode gas supply channel 124 to the anode gas discharge channel 130.

Further, the bipolar plate 108 may have a cathode gas flow field, through which the cathode gas can flow from the cathode gas supply channel 126 to the cathode gas discharge channel 132.

Further, the bipolar plate 108 may have a cooling medium flow field, through which the cooling medium can flow from the cooling medium supply channel 128 to the cooling medium discharge channel 134.

As can be seen best in FIG. 1, the bipolar plates 108 of the electrochemical units 104 are electrically insulated from one another by the respective electrically insulating seals 110 arranged between two bipolar plates 108, such that no short circuit can occur in the electrochemical device 100.

In the pressed state of the electrochemical units 104 depicted in FIG. 1, the seals 110 in the pressed state protrude laterally beyond the outer contour 116 of the bipolar plate 108 of the same electrochemical unit 104 in a direction of protrusion 136 directed perpendicularly to the stack direction 106.

In principle, provision may be made that the seals 110 each protrude in the direction of protrusion 136 beyond the outer contour 116 of the respectively associated bipolar plate 108 only over part of their periphery; provision is preferably made, however, that the seals 110 protrude in the direction of protrusion 136 beyond the respectively associated bipolar plate 108 across their entire periphery and across the entire periphery of the outer contour 116 of the respectively associated bipolar plate 108.

The seals 110 abut with insulating regions 138 that protrude beyond the respectively associated bipolar plate 108 against the seals 110 located above and below in the stack direction 106, such that the outer faces 140 of the seals 110 together form a closed outer sealing face 142 on the outer side of the electrochemical device 100.

The outer contours 116 of the bipolar plates 108 of the electrochemical units 104 are completely shielded from an outside space 144 of the electrochemical device 100 by this closed outer sealing face 142, such that no conductive elements, in particular no dirt, no foreign particles, and/or no contaminated, for example non-deionized, water is able to contact the bipolar plates 108 from the outside space 144 of the electrochemical device 100.

A short circuit between two successive bipolar plates 108 in the stack direction 106 due to contamination by such electrically conductive elements from the outside space 144 of the electrochemical device 100 is thereby excluded.

Further, provision may be made that in the pressed state of the electrochemical units 104 depicted in FIG. 1, the seals 110 protrude laterally in the direction of protrusion 136 directed perpendicularly to the stack direction 106 beyond at least one of the inner contours 118, which each surround a medium through-opening 120 of a medium channel 122 of the electrochemical device 100, of the bipolar plate 108 of the same electrochemical unit 104.

Both the outer contours 116 of the bipolar plates 108 and the inner contours 118 of the bipolar plates 108 thus form contours 119 of the bipolar plates 108, beyond which the seals 110 in the pressed state can laterally protrude in a direction of protrusion 136 directed perpendicularly to the stack direction 106.

In principle, provision may be made that the seals 110 each protrude in the direction of protrusion 136 beyond the respective inner contour 118 of the respectively associated bipolar plate 108 only over part of their periphery; provision is preferably made, however, that the seals 110 protrude in the direction of protrusion 136 beyond the respectively associated bipolar plate 108 across their entire inner periphery and across the entire periphery of the respective inner contour 118 of the respectively associated bipolar plate 108.

Furthermore, the seals 110 abut with insulating regions 138 protruding beyond the respectively associated bipolar plate 108 against the seals 110 located above and below in the stack direction 106, such that the inner faces 140' of the seals 110 together form a closed inner sealing face 142' on the inner side of the electrochemical device 100 and on the outer periphery of the respectively associated medium channel 122.

The inner contours 118 of the bipolar plates 108 of the electrochemical units 104 are completely shielded from the respectively associated medium channel 122 by this closed inner sealing face 142', such that no conductive elements, in particular no dirt, no foreign particles, and/or no contaminated, for example non-deionized, water is able to contact the bipolar plates 108 from the inside space 144' of the respectively associated medium channel 122.

A short circuit between two successive bipolar plates 108 in the stack direction 106 due to contamination by such electrically conductive elements from the inside space 144' of a medium channel 122 of the electrochemical device 100 is thereby excluded.

Figure 4:
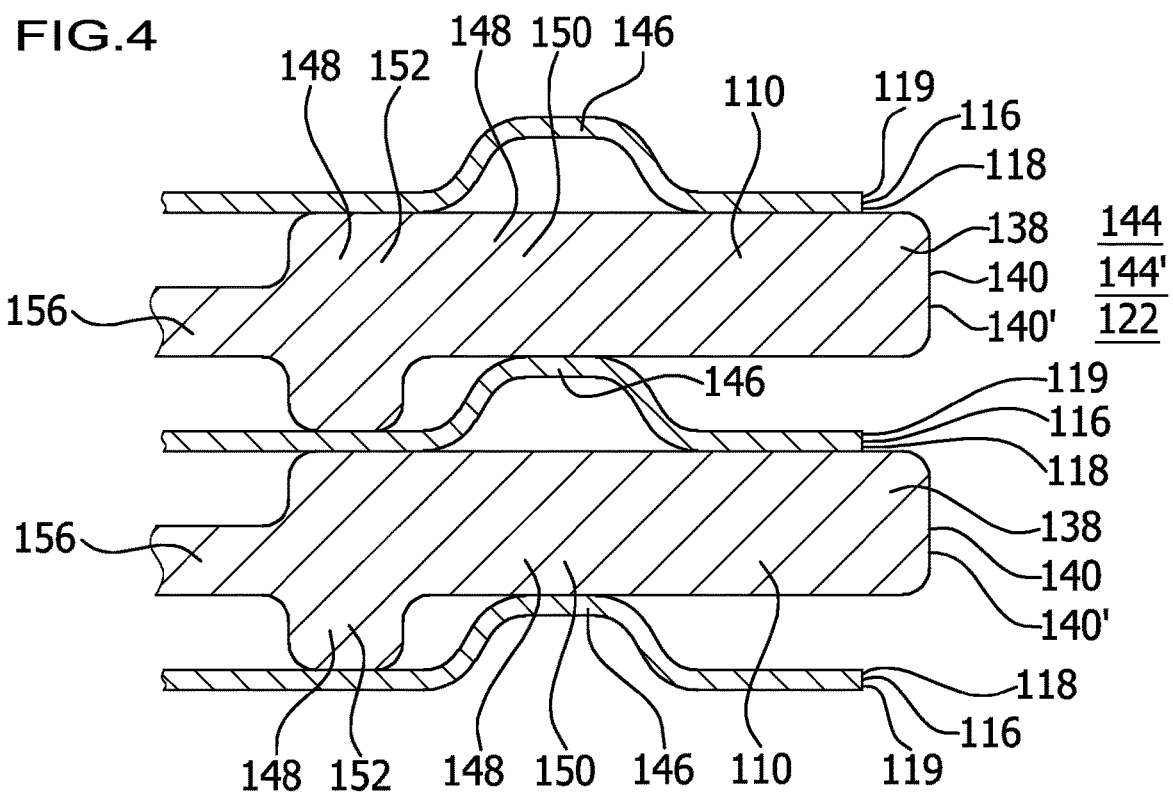
FIG. 4 shows a sectional cross section, corresponding to FIG. 3, through the electrochemical device from FIG. 1 in the region of an outer contour or an inner contour of the bipolar plates, in an unpressed state of the seals, before the pressing of the electrochemical units by means of the pressing device.

As can be seen in FIG. 4, which shows a sectional cross section through the electrochemical device 100 in the region of an outer contour 116 or in the region of an inner contour 118 of the bipolar plates 108, the bipolar plates 108 may each have a bead 146 in the region in which the seals 110 sealingly abut against the bipolar plates 108.

The seals 110 each have one or more contact regions 148, with which the seals 110 each abut against an adjacent bipolar plate 108 or against a plurality of adjacent bipolar plates 108.

For example, each seal 110 may have a first contact region 150, with which the seal abuts against the bead of the bipolar plate 108 of the same electrochemical unit 104, and a second contact region 152, with which the seal 110 abuts against the bipolar plate 108 of the same electrochemical unit 104 and, on a sealing face opposite this bipolar plate 108, against a bipolar plate 108 of an adjacent electrochemical unit 104.

Adjoining the contact region 148 or the contact regions 148 of the seal 110 is an insulating region 138 of the seal 110, which is arranged on the side of the contact region 148 or the contact regions 148 of the seals facing toward the outside space 144 of the electrochemical device 100 or the inside space 144' of a medium channel 122 of the electrochemical device 100.

Arranged on the side of the contact region 148 or contact regions 148 facing away from the insulating region 138 is a respective connection region 156 of the seal 110, by way of which the seal 110 can be connected, for example, to the electrochemically active unit (which is not depicted) of the respective electrochemical unit 104 and/or to a gas diffusion layer of the electrochemical unit 104.

As can be seen in FIG. 4, which depicts the unpressed state of the seals 110, before the pressing of the electrochemical units 104 by means of the clamping device 112, in this embodiment the seals 110 protrude laterally with their insulating regions 138 beyond the outer contours 116 or beyond the inner contours 118 of the bipolar plates 108 in the direction of protrusion 136 into the outside space 144 or into the inside space 144' of a medium channel 122 of the electrochemical device 100 already in the unpressed state of the seals 110.

However, the insulating regions 138 of the seals 110 do not yet contact one another in the unpressed state of the seals 110 depicted in FIG. 4.

Figure 3:
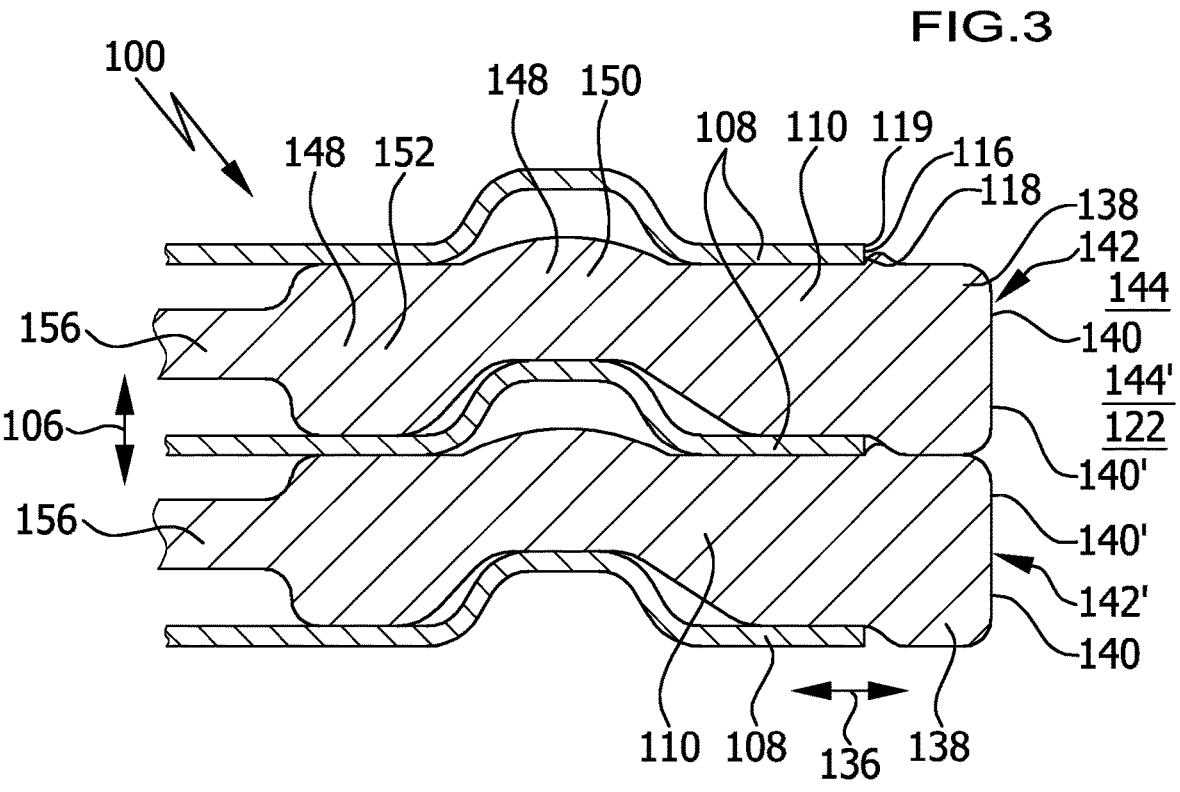
FIG. 3 shows a sectional cross section through the electrochemical device from FIG. 1 in the region of an outer contour or an inner contour of the bipolar plates, in a pressed state of the seals after the pressing of the electrochemical units by means of the clamping device.

In the pressed state of the seals 110 depicted in FIG. 3, after the pressing of the electrochemical units 104 by means of the clamping device 112, the seals 110 contact one another, such that the closed outer sealing face 142 is formed on the outer side of the electrochemical device 100 or the closed inner sealing face 142' is formed on a medium channel 122 of the electrochemical device 100.

Figure 5:
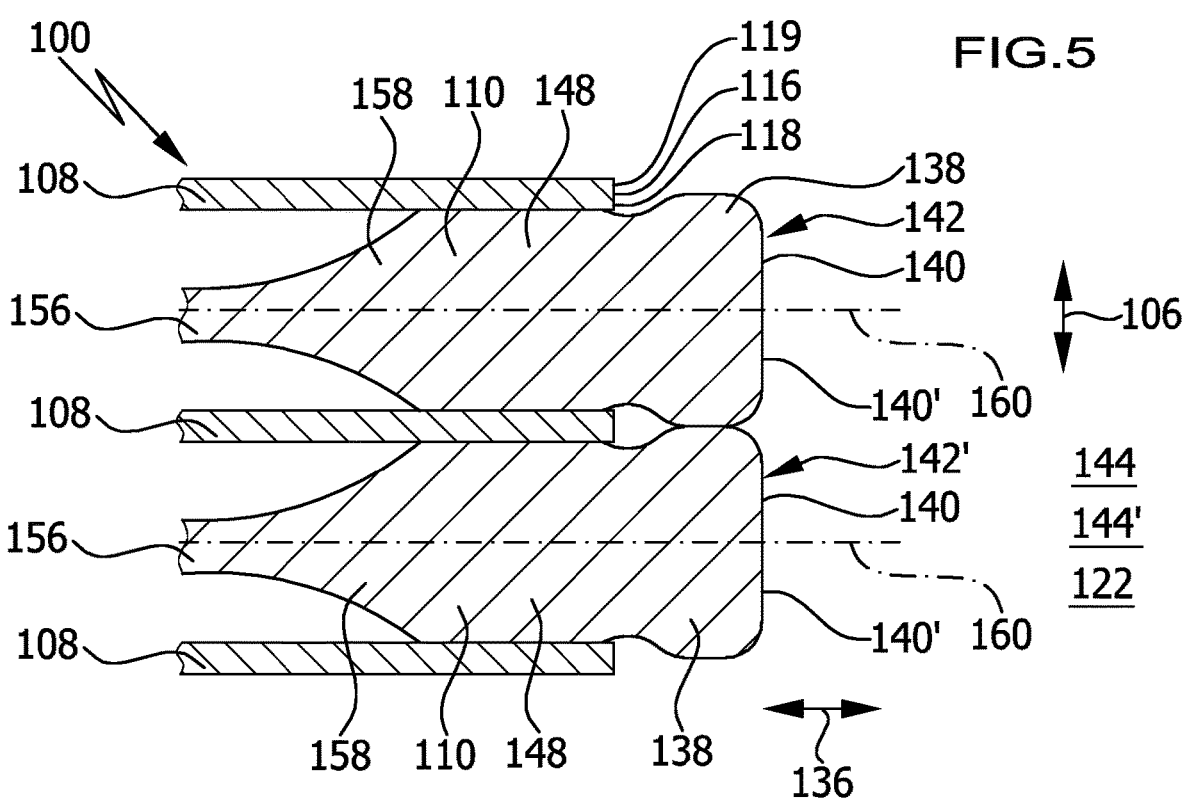
FIG. 5 shows a sectional cross section through a second embodiment of the electrochemical device, in which the seals comprise a wedge-shaped region, in a pressed state of the seals, after the pressing of the electrochemical units by means of the clamping device.

A second embodiment of an electrochemical device 100 depicted in FIG. 5 differs from the first embodiment depicted in FIGS. 1 to 4 in that the seals 110 have only one contact region 148, which abuts against two adjacent bipolar plates 108, and a wedge-shaped region 158 of the seals 110 is arranged on the side of the contact region 148 facing away from the insulating region 138.

In this wedge-shaped region 158, the thickness of the respective seals 110, i.e., the extent thereof along the stack direction 106, increases with decreasing distance from the insulating region 138.

In this embodiment, the wedge-shaped region 158, the contact region 148, and the insulating region 138 of the seals 110 are of substantially symmetrical configuration in relation to a midplane 160 of the seals 110, which in the assembled state of the electrochemical device 100 run, halfway up the respective seal 110, perpendicularly to the stack direction 106 through the respective seal 110.

FIG. 5 shows the seals 110 in the unpressed state, before the pressing of the electrochemical units 104 by means of the clamping device 112.

FIG. 5 shows that, in this embodiment, the seals 110 protrude laterally along the direction of the protrusion 136 beyond the outer contour 116 or beyond the inner contour 118 of the bipolar plates 108 already in the unpressed state and that the insulating regions 138 already contact one another in the unpressed state of the seals 110.

As a result of the pressing of the electrochemical units 104 by means of the clamping device 112, the contact regions 148 and the insulating regions 138 arranged thereon are moved even further into the outside space 144 of the electrochemical device 100 or into the inside space 144' of the medium channel 122.

In all other respects, the second embodiment of an electrochemical device 100 depicted in FIG. 5 corresponds with respect to structure, function, and production method with the first embodiment depicted in FIGS. 1 to 4, to the preceding description of which reference is made in this regard.

Figure 6:
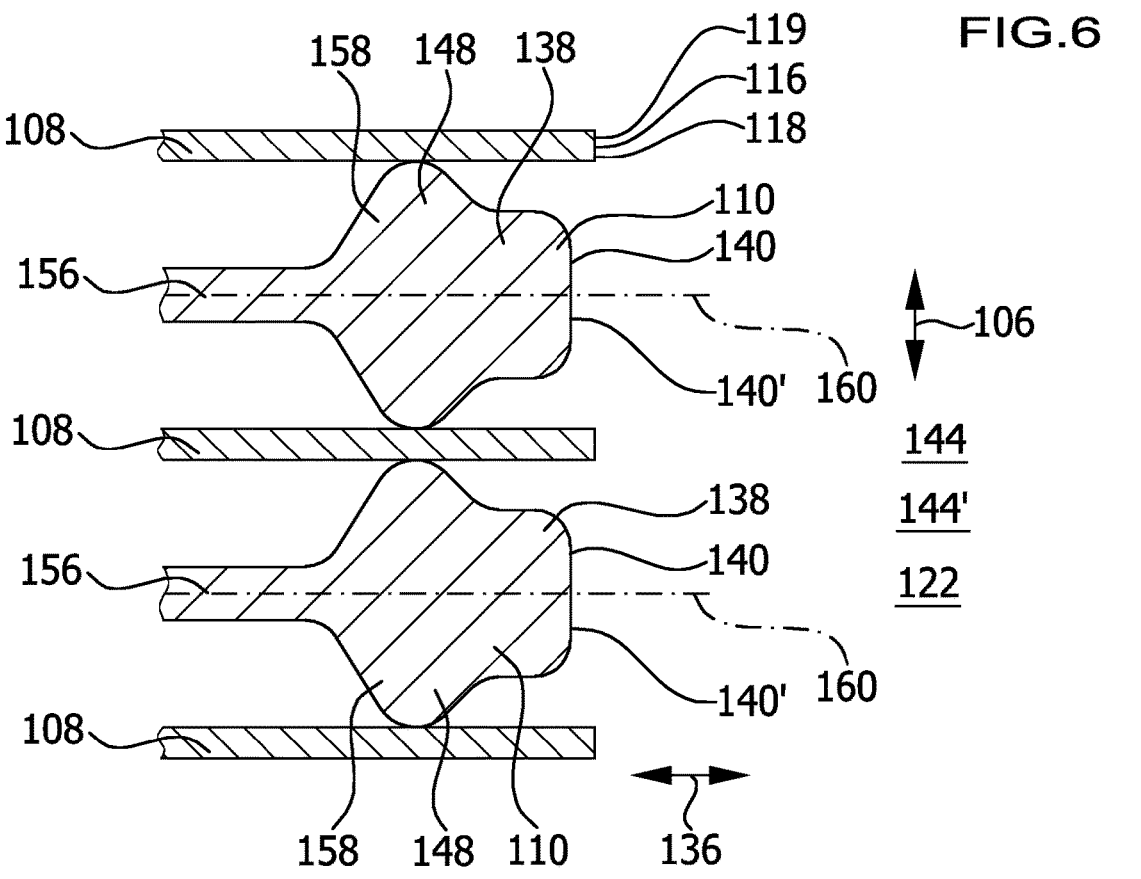
FIG. 6 shows a sectional cross section through a third embodiment of the electrochemical device, in which the seals in the unpressed state do not protrude laterally beyond an outer contour or an inner contour of the bipolar plates, in the unpressed state of the seals, before the pressing of the electrochemical units by means of the clamping device.

A third embodiment of an electrochemical device 100 depicted sectionally in FIG. 6 differs from the second embodiment depicted in FIG. 5 in that the seals 110 in the unpressed state of the seals 110 depicted in FIG. 6, before the pressing of the electrochemical units 104 by means of the clamping device 112, do not yet protrude laterally in the direction of protrusion 136 beyond the outer contour 116 or beyond the inner contour 118 of the bipolar plates 108.

During the pressing of the electrochemical units 104, the seals 110 move, however, in the direction of protrusion 136 so far that the overhang of the seals 110 beyond the outer contour 116 or beyond the inner contour 118 of the bipolar plates 108 is achieved during the pressing of the stack 102 of electrochemical units 104.

In the pressed state of the seals 110 (which is not depicted), the insulating regions 138 of successive seals 110 along the stack direction 106 abut against one another, such that a closed outer sealing face 142 or a closed inner sealing face 142' is formed in this embodiment, too.

Furthermore, in this embodiment, the insulating regions 138 of the seals 110 are made so thick in the stack direction 106 that they have contact with both bipolar plates 108 adjacent to the respective seal 110 after the pressing of the electrochemical units 104 by means of the clamping device 112.

In all other respects, the third embodiment of an electrochemical device 100 depicted in FIG. 6 corresponds with respect to structure, function, and production method with the second embodiment depicted in FIG. 5, to the preceding description of which reference is made in this regard.

Figures 7, 8:
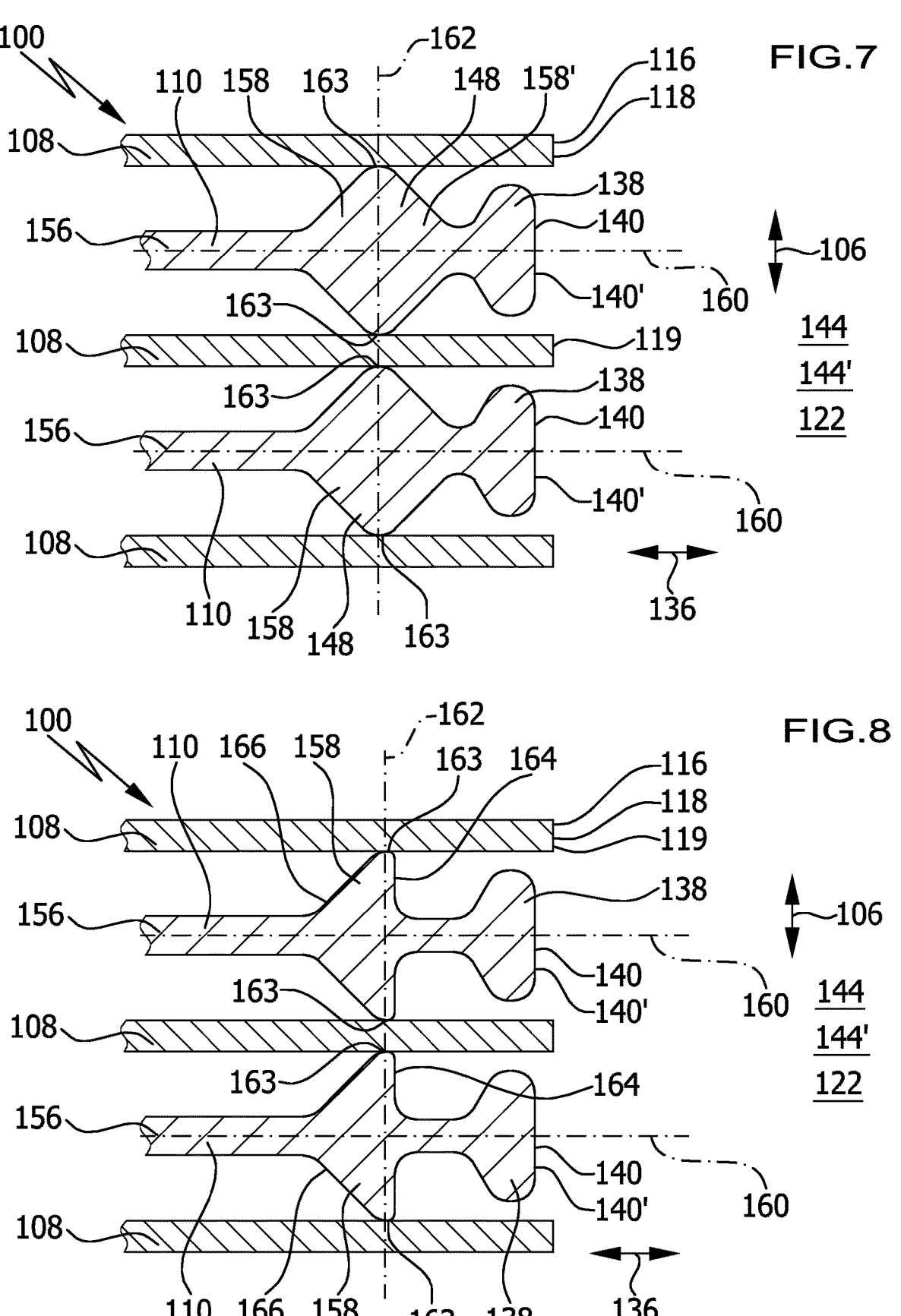
FIG. 7 shows a sectional cross section through a fourth embodiment of the electrochemical device, in which the seals each comprise a wedge-shaped region, a symmetrically formed contact region, and an insulating region, in an unpressed state of the seals, before the pressing of the electrochemical units by means of the clamping device.
FIG. 8 shows a sectional cross section through a fifth embodiment of the electrochemical device, in which the seals have a wedge-shaped region, an asymmetrical contact region, and an insulating region, in an unpressed state of the seals, before the pressing of the electrochemical units by means of the clamping device.

A fourth embodiment of an electrochemical device 100 depicted sectionally in FIG. 7 differs from the third embodiment depicted in FIG. 6 in that, in this embodiment, the seals 110 have two wedge-shaped regions 158 and 158', between which a contact region 148 of the respective seal 110 is arranged, which is of substantially symmetrical configuration in relation to a longitudinal plane 162 of the seal 110. The longitudinal plane 162 extends in parallel to the outer face 140 of 140' of the respective seal 110 and in parallel to the stack direction 106, as well as through the rounded tips 163 of the contact region 148, with which the contact region 148 abuts against a respective one of the adjacent bipolar plates 108.

In the second wedge-shaped region 158' of the seal 110, the thickness of the seal 110, i.e., the extent thereof along the stack direction 106, decreases with decreasing distance from the insulating region 138 of the seal 110.

In this embodiment, the insulating region 138 of the seal 110 is configured such that after assembly of the stack 102, but before the pressing of the electrochemical units 104 by means of the clamping device 112, it is not in contact with the adjacent bipolar plates 108.

However, when pressing the electrochemical units 104, the insulating region 138 is moved beyond the outer contour 116 or beyond the inner contour 118 of the bipolar plates 108 as a result of the movement of the insulating reason 138 caused by the volumetric displacement of the contact region 148 and the wedge-shaped regions 158 and 158'.

In the pressed state of the seals 110, the insulating regions 138 of successive seals 110 in the stack direction 106 contact one another, and a closed outer sealing face 142 or a closed inner sealing face 142' is formed, which shields the bipolar plates 108 from the outside space 144 of the electrochemical device 100 or from the inside space 144' of a medium channel 122 of the electrochemical device 100.

In this case, the outer edges of the bipolar plates 108 are preferably completely enclosed by the sealing material of the seals 110.

In all other respects, the fourth embodiment of an electrochemical device 100 depicted in FIG. 7 corresponds with respect to structure, function, and production method with the third embodiment depicted in FIG. 6, to the preceding description of which reference is made in this regard.

A fifth embodiment of an electrochemical device 100 sectionally depicted in FIG. 8 differs from the fourth embodiment depicted in FIG. 7 in that the second wedge-shaped region 158' of the seals 110 is omitted and the contact region 148 of the sealing elements 110 is of asymmetrical configuration in relation to the longitudinal plane 162 of the seals 110 running through the rounded tips 163 of the contact region 148.

In particular, the contact region 148 is configured such that its flank 164 directed toward the insulating region 138 encloses a smaller angle with the stack direction 106 than its flank 166 directed away from the insulating region 138.

In particular, provision may be made that the flank 164 of the contact region 148 directed toward the insulating region 138 is aligned substantially in parallel to the stack direction 106.

As a result of this asymmetrical configuration of the contact region 148 of the seals 110, a movement of the sealing material out of the region between the bipolar plates 108 into the outside space 144 of the electrochemical device 100 or into the inside space 144' of the medium channel 122 when pressing the electrochemical units 104 by means of the clamping device 112 is encouraged.

In all other respects, the fifth embodiment of the electrochemical device 100 depicted in FIG. 8 corresponds with respect to structure, function, and production method with the fourth embodiment depicted in FIG. 7, to the preceding description of which reference is made in this regard.

Figure 9:
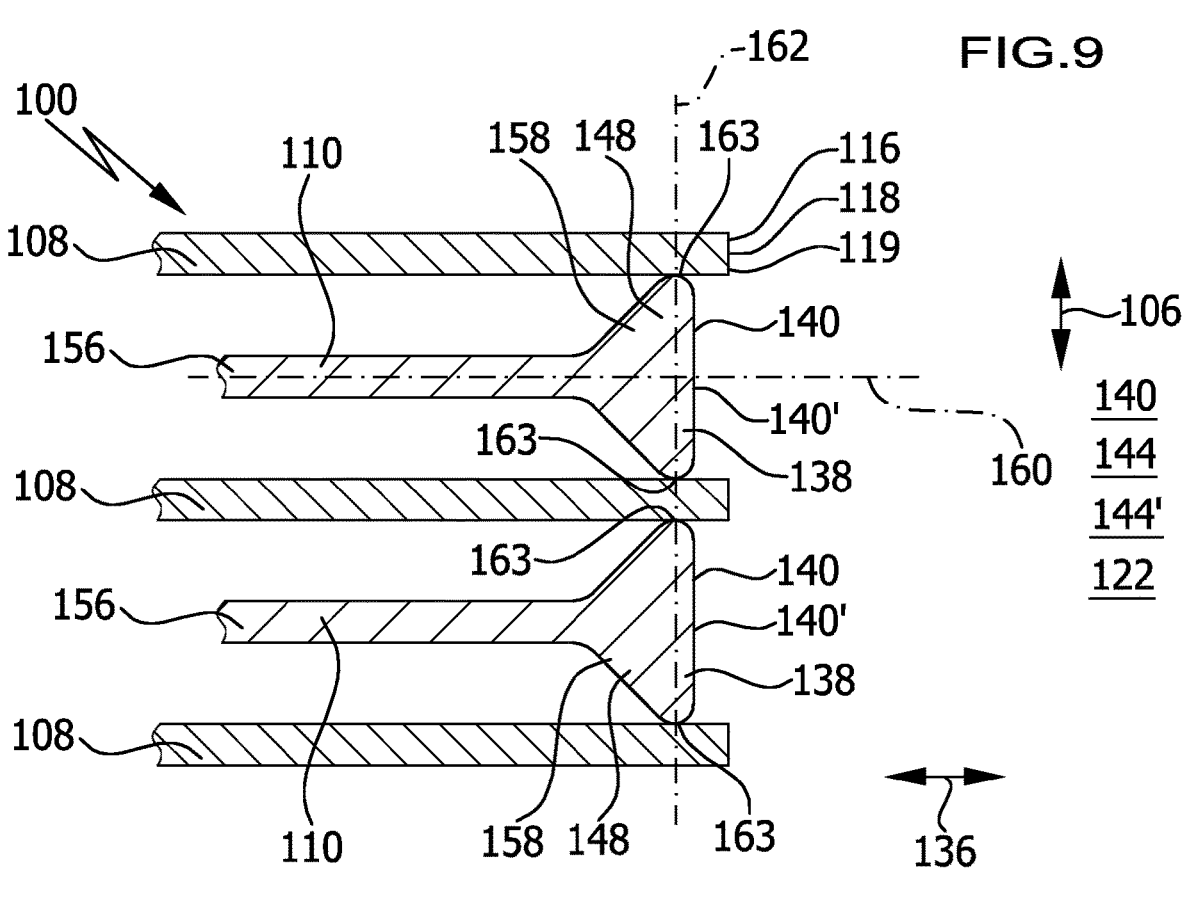
FIG. 9 shows a sectional cross section through a sixth embodiment of the electrochemical device, in which the seals have a wedge-shaped region, in an unpressed state of the seals, before the pressing of the electrochemical units by means of the clamping device.

A sixth embodiment of an electrochemical device 100 sectionally depicted in FIG. 9 differs from the fifth embodiment depicted in FIG. 8 in that the seals 110 have no separate insulating region 138 provided in addition to the contact region 148, which is arranged on a side of the contact region 148 facing toward the outside space 144 or the inside space 144' of the medium channel 122, but instead the contact region 148 itself simultaneously also assumes the function of an insulating region 138 with which the seals 110, in the pressed state of the seals 110, after the pressing of the electrochemical units 104 by means of the clamping device 112, abut against one another in order to improve a closed outer sealing face 142 or a closed inner sealing face 142'.

The contact region 148 is dimensioned such that during the pressing of the electrochemical units 104, it moves along the direction of protrusion 136 completely or at least partially beyond the outer contour 116 or beyond the inner contour 118 of the bipolar plates 108.

In the unpressed state of the seals 110 depicted in FIG. 9, the contact region 148 abuts completely against the two adjacent bipolar plates 108.

In all other respects, the sixth embodiment of the electrochemical device 100 depicted in FIG. 9 corresponds with respect to structure, function, and production method with the fifth embodiment depicted in FIG. 8, to the preceding description of which reference is made in this regard.

Figure 10:
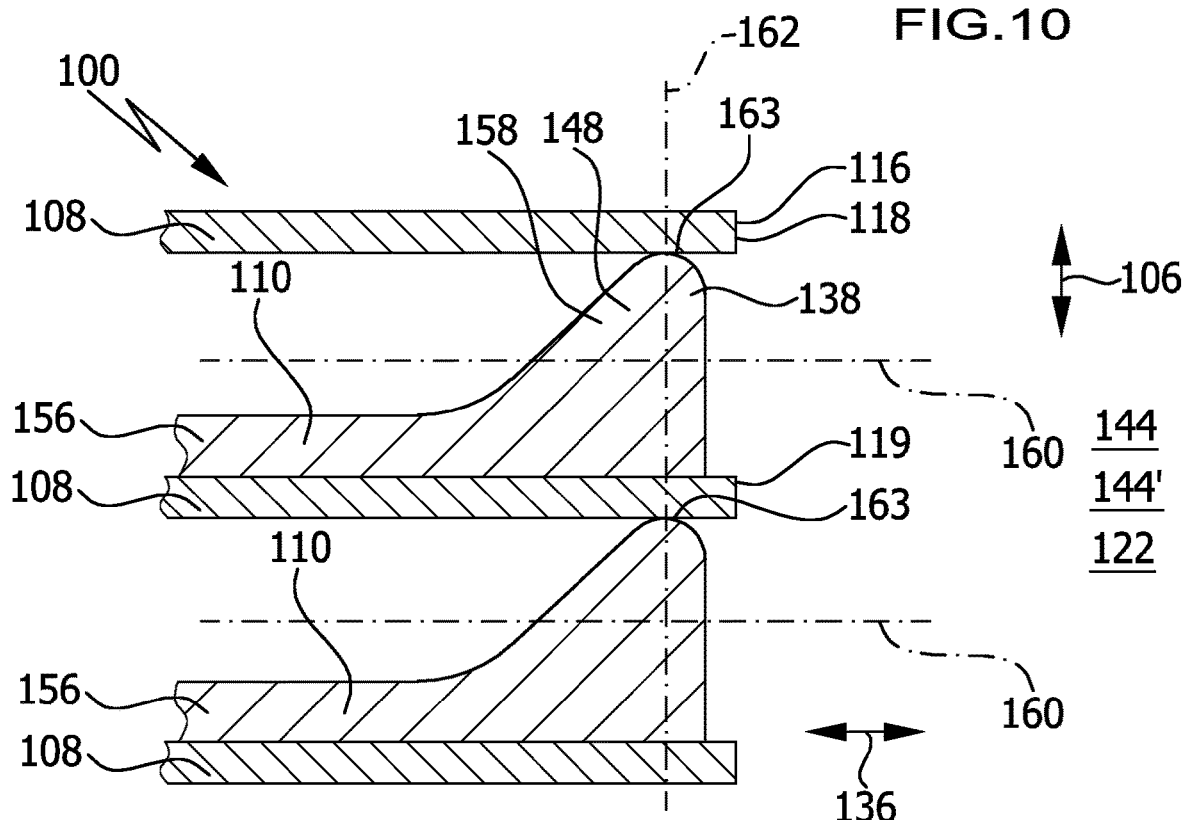
FIG. 10 shows a sectional cross section through a seventh embodiment of the electrochemical device, in which the seals have a wedge-shaped region and a contact region, which is of asymmetrical configuration in relation to a plane directed parallel to the stack direction, in an unpressed state of the seals, before the pressing of the electrochemical units by means of the clamping device.

A seventh embodiment of an electrochemical device 100 sectionally depicted in FIG. 10 differs from the sixth embodiment depicted in FIG. 9 in that the seals 110 are of asymmetrical configuration in relation to the midplane 160 of the respective seal 110, which runs, halfway up the respective seal 110, perpendicularly to the stack direction 106 through the respective seal 110.

In particular, provision may be made that the contact region 148, which simultaneously also assumes the function of an insulating region 138, the wedge-shaped region 158, and the connection region 156 are in, preferably surface-to-surface, contact with the bipolar plate 108 of the same electrochemical unit 104.

The seals 110 are preferably materially bonded to the bipolar plate 108 of the respective electrochemical unit 104.

In particular, provision may be made that the seals are produced in situ on the respectively associated bipolar plate 18 by an injection molding process, a pattern printing process, in particular a screen printing process, or by a dispenser application process.

The bipolar plates 108 may each be of one-piece configuration or comprise a plurality, preferably two or more, bipolar plate layers.

The contact region 148 of the seals 110 is designed such that during the pressing of the electrochemical units 104 by means of the clamping device 112, it moves along the direction of protrusion 136 beyond the outer contour 116 or the inner contour 118 of the bipolar plates 108 into the outside space 144 of the electrochemical device 100 or into the inside space 144' of the medium channel 122.

In all other respects, the seventh embodiment of the electrochemical device 100 depicted in FIG. 10 corresponds with respect to structure, function, and production method with the sixth embodiment depicted in FIG. 9, to the preceding description of which reference is made in this regard.

The seals 110 described above may each be connected to a bipolar plate 108 or to a plurality of bipolar plates 108, to a gas diffusion layer or to a plurality of gas diffusion layers, to part of an electrochemically active unit, in particular of a membrane electrode arrangement, and/or to another support element.

The seals 110 are preferably made of an elastomer material.

The bipolar plates 108 are preferably made of a metallic material.

The bipolar plates 108 may each be of one-piece configuration and comprise only one single bipolar plate layer or a plurality, in particular two or more, bipolar plate layers.

The invention claimed is:

1. An electrochemical device, comprising a plurality of electrochemical units, which succeed one another along a stack direction, wherein each electrochemical unit comprises a bipolar plate and an electrically insulating seal, and a clamping device for pressing together the electrochemical units along the stack direction, wherein at least one seal of at least one electrochemical unit in the pressed state protrudes laterally beyond a contour of the bipolar plate of the electrochemical unit in a direction of protrusion directed perpendicularly to the stack direction, wherein at least one outer contour of at least one bipolar plate is shielded from an outside space of the electrochemical device by at least one seal adjacent to the bipolar plate, wherein the seal, in at least one of the unpressed state and the pressed state, abuts with at least one contact region against two adjacent bipolar plates of the electrochemical device, wherein these two adjacent bipolar plates of the electrochemical device are electrically insulated from one another by the seal, and wherein the at least one seal is made of an elastomer material.

2. The electrochemical device in accordance with claim 1, wherein at least one seal of at least one electrochemical unit in the pressed state protrudes beyond an outer contour of the bipolar plate of the electrochemical unit into an outside space of the electrochemical device.

3. The electrochemical device in accordance with claim 1, wherein at least one seal of at least one electrochemical unit in the pressed state protrudes beyond an inner contour of the bipolar plate of the electrochemical unit into a medium channel of the electrochemical device.

4. The electrochemical device in accordance with claim 1, wherein at least one seal of at least one electrochemical unit in the pressed state abuts against a seal of an adjacent electrochemical unit.

5. The electrochemical device in accordance with claim 1, wherein at least one inner contour of at least one bipolar plate is shielded from a medium channel of the electrochemical device by at least one seal adjacent to the bipolar plate.

6. The electrochemical device in accordance with claim 1, wherein the seal in the unpressed state does not protrude laterally beyond the contour of the bipolar plate in a direction of protrusion directed perpendicularly to the stack direction.

7. The electrochemical device in accordance with claim 1, wherein the contact region in the unpressed state is of asymmetrical configuration in relation to a longitudinal plane of the seal, which extends in parallel to the stack direction and in parallel to a longitudinal direction of the seal through a rounded tip of the contact region.

8. The electrochemical device in accordance with claim 1, wherein the seal comprises an insulating region, which in the pressed state abuts against an insulating region of a further seal of the electrochemical device.

9. The electrochemical device in accordance claim 1, wherein the sealing element has at least one wedge-shaped region.

10. The electrochemical device in accordance with claim 1, wherein the outer faces of the seals of the electrochemical device in the pressed state form a closed outer sealing face on an outer side of the electrochemical device.

11. The electrochemical device in accordance with claim 1, wherein the inner faces of the seals of the electrochemical device in the pressed state form a closed inner sealing face on an inner side of the electrochemical device adjoining a medium channel of the electrochemical device.

12. A method for producing an electrochemical device, comprising the following:

forming a stack, which comprises a plurality of electrochemical units succeeding one another along a stack direction, wherein each electrochemical unit comprises a bipolar plate and an electrically insulating seal; and clamping the stack of electrochemical units by means of a clamping device;

wherein at least one seal of at least one electrochemical unit in the pressed state protrudes laterally beyond a contour of the bipolar plate of the electrochemical unit in a direction of protrusion directed perpendicularly to the stack direction, wherein at least one outer contour of at least one bipolar plate is shielded from an outside space of the electrochemical device by at least one seal adjacent to the bipolar plate, wherein the seal, in at least one of the unpressed state and the pressed state, abuts with at least one contact region against two adjacent bipolar plates of the electrochemical device, wherein these two adjacent bipolar plates of the electrochemical device are electrically insulated from one another by the seal, and wherein the at least one seal is made of an elastomer material.

13. The method in accordance with claim 12, wherein at least one seal of at least one electrochemical unit in the unpressed state does not protrude laterally beyond the contour of the bipolar plate in a direction of protrusion directed perpendicularly to the stack direction.

14. The electrochemical device in accordance with claim 1, wherein each of the bipolar plates of the electrochemical units is of multi-layer configuration.

15. The method in accordance with claim 12, wherein each of the bipolar plates of the electrochemical units is of multi-layer configuration.

* * * * *